June 10, 1952  C. H. FOLMSBEE  2,599,622
RESILIENT SEAL SAFETY VALVE
Filed Jan. 3, 1947
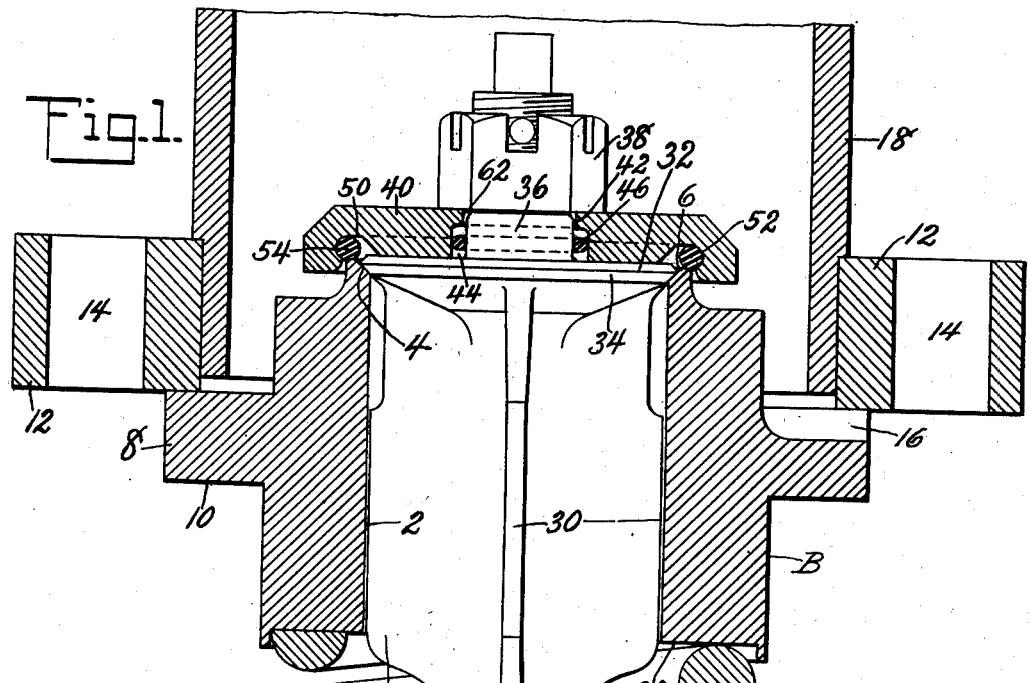
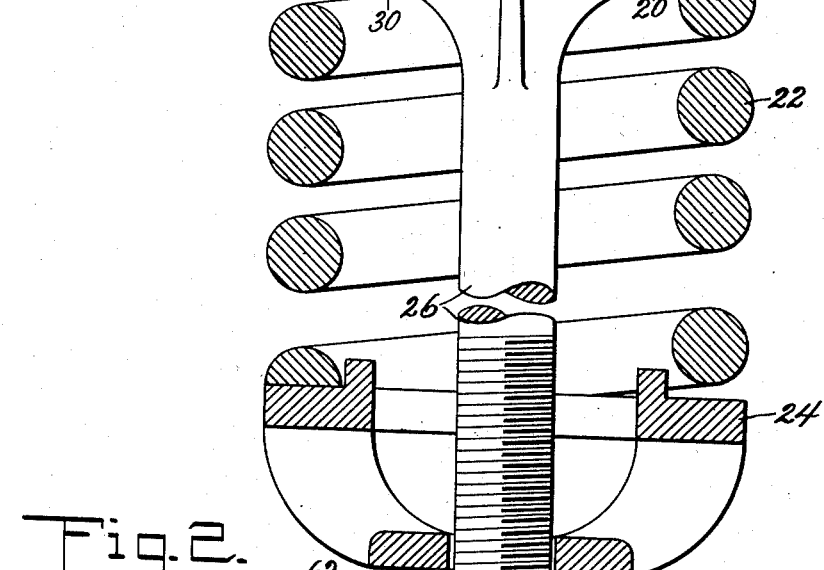
INVENTOR
Clyde H. Folmsbee
BY
Robert A. Shields
ATTORNEY Patented June 10, 1952

2,599,622

UNITED STATES PATENT OFFICE 2,599,622

RESILIENT SEAL SAFETY VALVE

Clyde H. Folmsbee, Bloomsburg, Pa., assignor to American Car and Foundry Company, New York, N. Y., a corporation of New Jersey Application January 3, 1947, Serial No. 720,072

3 Claims. (Cl. 137—53)

This invention relates to safety valves in general and in particular to safety valves which are intended for use with dangerous gases.

Safety valves have previously been made with parts so arranged that the so called sealing gasket could be removed and replaced while the valves was in service. However, with this type of valve the gasket did not function efficiently and was apt to be replaced during repair by unsuitable gasket material which would permit leaks of dangerous gases such as chlorine. It is an object, therefore, of the present invention to provide a safety valve which is sealed against leakage by means of special form resilient sealing members.

A further object of the invention is the provision of a safety valve having a resilient seal which tightens under leakage pressure.

A still further object of the invention is a safety valve having resilient seals preventing leakages of gases past the valve.

A yet further object of the invention is the provision of a safety valve sealed by resilient annulus of circular cross section which can be readily removed and replaced without modifying the setting of the safety valve.

These and other objects of the invention will be apparent to persons skilled in the art from a study of the following description and accompanying drawings, in which Fig. 1 is a sectional view through the improved safety valve, and Fig. 2 is an enlarged sectional view better disclosing the relation of the sealing parts.

Referring now to the drawings in detail it will be seen that the valve body B is made up of a one-piece member having a central bore 2 and with the top surface of the member beveled as at 4 to provide a valve seat. Outwardly of the valve seat the body has its upper surface ground or otherwise finished to provide a smooth seating surface 6 which surface merges into a downwardly then outwardly directed top surface, across which the escaping gases will be directed. The body is provided with a projecting shoulder 8, the under surface of which is finished to provide a gasket engaging surface 10 and the upper surface of which is finished to receive a bolting ring 12 having bolt openings 14 therein. The shoulder 8 is grooved at one or more places such as 16 to provide drainage passages for escape of condensed liquid, rain, etc. The bolting ring as clearly shown has attached thereto the lower end of a stack pipe 18 which may be either threaded or welded into the bolting ring and which will be of sufficient length to properly discharge the escaping gases and prevent injury to the top portion of the safety valve. The lower portion of the valve body is recessed as at 20 to provide a seat for the upper end of a spring 22, the lower end of which bears upon a lower spring seat member 24. This lower spring seat member is slidably mounted on the lower end of valve stem 26 and is held in adjusted position on the valve stem by means of locking nuts 28.

The upper end of the valve stem is enlarged to provide a plurality of guide wings 30. These guide wings merge into the valve 32 which has its under surface carefully machined to provide a valve seating surface 34 adapted to engage the seating surface 4 of the valve body. Normally this metallic engagement between the valve seating surface 34 and body seating surface 4 is sufficient to prevent leakage of material. However, with use slight leakages may develop at these metallic seating surfaces and with dangerous gases it is necessary that all leaks be prevented. Upwardly of the valve proper the stem is extended to provide a short smooth stem portion 36, which upwardly of the smooth portion is threaded to receive a nut or other clamping member 38. This nut or clamping member is adapted to firmly engage and squeeze a valve head disc 40 onto the top surface of the valve.

The valve head disc, as clearly shown, is provided with a central opening 42 adapted to rather closely engage the smooth stem 36 and this opening is enlarged or counter-bored as at 44 to receive a small annular ring of circular cross section 46. This annular ring is of such dimension with respect to the space between the counter-bore and stem 36 as to be slightly precompressed between the surfaces in a direction perpendicular to the axis of the valve stem. Outwardly of the central opening the valve head disc is under cut as at 50 so as to provide a recess 52 into which the annular ring 54 of circular cross section may be snapped prior to assembly of the disc on the valve. This annulus 54 is of such dimension as to be lightly compressed between the under cut portion of the disc and the seating surface 6 of the valve body. Also, the annulus is of such a dimension as to prevent its accidental removal through the space of the under cut portion of the disc and the valve when the valve assembly is lifted from the seating surfaces of the body.

It will be seen from the above description that it is impossible to squeeze either of the annular rings 46 or 54 by tightening the nut 38 since this nut can only jam the metal ring 40 onto the valve. It will also be obvious that any leakage past metallic seating surfaces 4 and 34 will be trapped beneath the head disc 40 by the annular rings 46 and 54. Any trapped leakage pressure will tend to jam the ring 54 into the clearance space 60, while the same pressure will tend to jam the ring 46 into the clearance space 62 between the disc and shoulder 36. In this manner any leakage past the metal seat will be effectively stopped by the annular rings which will with increase in leakage pressure be more tightly jammed into the clearance spaces. Thus the annular rings will be but lightly stressed under normal conditions, but will be more heavily stressed in direct proportion to the leakage pressure which they must resist. In other words, this may be referred to as self-tightening or pressure-tightening resilient gaskets. It will be seen that the annular rings may be readily replaced by merely removing the head disc 40 and without in any way disturbing the valve. In other words, the rings may be replaced while the vessel to which the safety valve is applied is under pressure. Any changes in the seating position of the valve, such as may occur with wear between seats 4 and 34, will but slightly change the precompression on ring 54, but at no time can the pressure reach a value which would tend to destroy the annular ring 54.

Although the valve has been described with specific reference to the single form shown, it will be obvious that slight changes may be made without departing from the invention as defined by the following claims.

What is claimed is:

1. In a safety valve, a valve body having a valve seat, a valve reciprocable within the body and having a valve seat cooperating with said body valve seat to normally seal the valve against leakage of matter, a stem extending upwardly from said valve, a head disc surrounding said stem and rigidly clamped onto said valve by means secured to said stem, said head disc being spaced a predetermined distance from said stem and a predetermined distance from said valve body, and annular seals of circular cross-section occupying and shiftable within the spaces between said head disc and stem and head disc and body.

2. In a safety valve, a valve body having a valve seat, a valve reciprocable within the body and having a valve seat cooperating with said body valve seat to normally seal the valve against leakage of matter, a stem extending upwardly from said valve, a head disc surrounding said stem and clamped into direct contact with said valve by means secured to said stem, said head disc being spaced predetermined distances from said stem and from said valve body, and annular seals of circular cross-section occupying the spaces between said head disc and stem and head disc and body, said annular seals being formed of resilient material distortable by leakage of pressure past said seats into said spaces to seal against leakage of matter out of said valve.

3. In a safety valve, a valve body having a valve seat, a valve reciprocable within the body and having a valve seat cooperating with said body valve seat to normally seal the valve against leakage of matter, a stem extending upwardly from said valve, a head disc surrounding said stem and clamped into direct contact with said valve by means secured to said stem, said head disc being spaced predetermined distances from said stem and from said valve body to provide channelways between these parts, said channelways being elongated in cross section and restricted at their outer portions, and annular seals of circular cross section located in said channelways outwardly of said valve, said annular seals being formed of resilient material distortable by pressure leaking past said seats and accumulating in said channelways between said valve and said seals.

CLYDE H. FOLMSBEE.

REFERENCES CITED

The following references are of record in the file of this patent:

UNITED STATES PATENTS

| Number | Name | Date |
| --- | --- | --- |
| 763,208 | Robinson | June 21, 1904 |
| 964,468 | Guss | July 12, 1910 |
| 1,725,297 | Paterson | Aug. 20, 1929 |
| 1,774,690 | Willoughby | Sept. 2, 1930 |
| 1,785,278 | MacClatchie | Dec. 16, 1930 |
| 2,299,079 | Davis | Oct. 20, 1942 |

FOREIGN PATENTS

| Number | Country | Date |
| --- | --- | --- |
| 12,911 | Great Britain | of 1904 |